United States Patent
Kumar et al.

(10) Patent No.: US 11,296,964 B2
(45) Date of Patent: Apr. 5, 2022

(54) TECHNOLOGIES FOR DYNAMICALLY GENERATING NETWORK TOPOLOGY-BASED AND LOCATION-BASED INSIGHTS

(71) Applicant: Cisco Technology, Inc., San Jose, CA (US)

(72) Inventors: Abhishek Kumar, Vancouver (CA); Erwan Barry Tarik Zerhouni, Zürich (CH); Javier Cruz Mota, Lussy-sur-Morges (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 158 days.

(21) Appl. No.: 16/563,472

(22) Filed: Sep. 6, 2019

(65) Prior Publication Data
US 2021/0075707 A1 Mar. 11, 2021

(51) Int. Cl.
  *H04L 12/26* (2006.01)
  *H04L 43/067* (2022.01)
  *H04L 43/04* (2022.01)

(52) U.S. Cl.
  CPC ............ *H04L 43/067* (2013.01); *H04L 43/04* (2013.01)

(58) Field of Classification Search
  USPC ....................................................... 709/224
  See application file for complete search history.

(56) References Cited

U.S. PATENT DOCUMENTS

| | | | |
|---|---|---|---|
| 9,247,436 B2 | 1/2016 | Moore et al. | |
| 10,305,746 B2 | 5/2019 | Ganjam et al. | |
| 10,354,213 B1* | 7/2019 | Ings | G06Q 10/067 |
| 10,355,938 B2 | 7/2019 | Saha et al. | |
| 2017/0302505 A1* | 10/2017 | Zafer | H04L 69/40 |
| 2019/0104041 A1 | 4/2019 | Tabak et al. | |
| 2019/0132230 A1* | 5/2019 | Chandrasekaran | H04L 47/28 |
| 2019/0235941 A1* | 8/2019 | Bath | G06F 11/079 |
| 2020/0026575 A1* | 1/2020 | Guim Bernat | G06F 9/5094 |

OTHER PUBLICATIONS

"Network Performance Insight Overview," IBM, 2015-2018, https://tnpmsupport.persistentsys.com, pp. 1-70.

* cited by examiner

*Primary Examiner* — Wing F Chan
*Assistant Examiner* — Leon Y Tseng
(74) *Attorney, Agent, or Firm* — Polsinelli PC

(57) ABSTRACT

Technologies for dynamically generating topology and location based network insights are provided. In some examples, a method can include determining statistical changes in time series data including a series of data points associated with one or more conditions or parameters of a network; determining a period of time corresponding to one or more of the statistical changes in the time series data; obtaining telemetry data corresponding to a segment of the network and one or more time intervals, wherein a respective length of each time interval is based on a length of the period of time corresponding to the one or more of the statistical changes in the time series data; and generating, based on the telemetry data, insights about the segment of the network, the insights identifying a trend or statistical deviation in a behavior of the segment of the network during the one or more time intervals.

17 Claims, 10 Drawing Sheets

TECHNOLOGIES FOR DYNAMICALLY GENERATING NETWORK TOPOLOGY-BASED AND LOCATION-BASED INSIGHTS

TECHNICAL FIELD

The subject matter of this disclosure generally relates to computer networking and, more specifically, to generating network insights.

BACKGROUND

A computer network can provide connectivity to computing devices (e.g., servers, workstations, personal computers, tablets, mobile phones, etc.) and things (e.g., desk phones, security cameras, lighting, heating, locks, medical devices, industrial equipment, etc.) within environments such as offices, hospitals, universities, factories, and other locations. Some of the various challenges a campus network can face include integrating wired and wireless devices, on-boarding computing devices and things that can appear anywhere in the network, maintaining connectivity when devices and things migrate from one location to another within the network, supporting bring your own device (BYOD) capabilities, connecting Internet-of-Things (IoT) devices, and securing the network despite numerous potential vulnerabilities.

Moreover, computer networks are becoming increasingly complex, often involving low level and high level configurations at various layers of the network. For example, computer networks generally include numerous security, routing, and service policies, which together define the behavior and operation of the network. Moreover, network operators have a wide array of configuration options for tailoring the behavior of the network. While such configuration options provide flexibility and control over the network, they also add complexity. In addition, computer networks can experience various problems that can impact the health and performance of the network, such as link or device failures, security vulnerabilities, user and software errors, policy conflicts, traffic fluctuations, etc. Given the high complexity of networks and numerous problems that often emerge in a network, it can be very difficult to detect, predict, and troubleshoot network issues and ensure the continued health of a network.

BRIEF DESCRIPTION OF THE DRAWINGS

To provide a more complete understanding of the present disclosure, features and advantages thereof, reference is made to the following description, taken in conjunction with the accompanying drawings, in which.

DESCRIPTION OF EXAMPLE EMBODIMENTS

Figure 1:
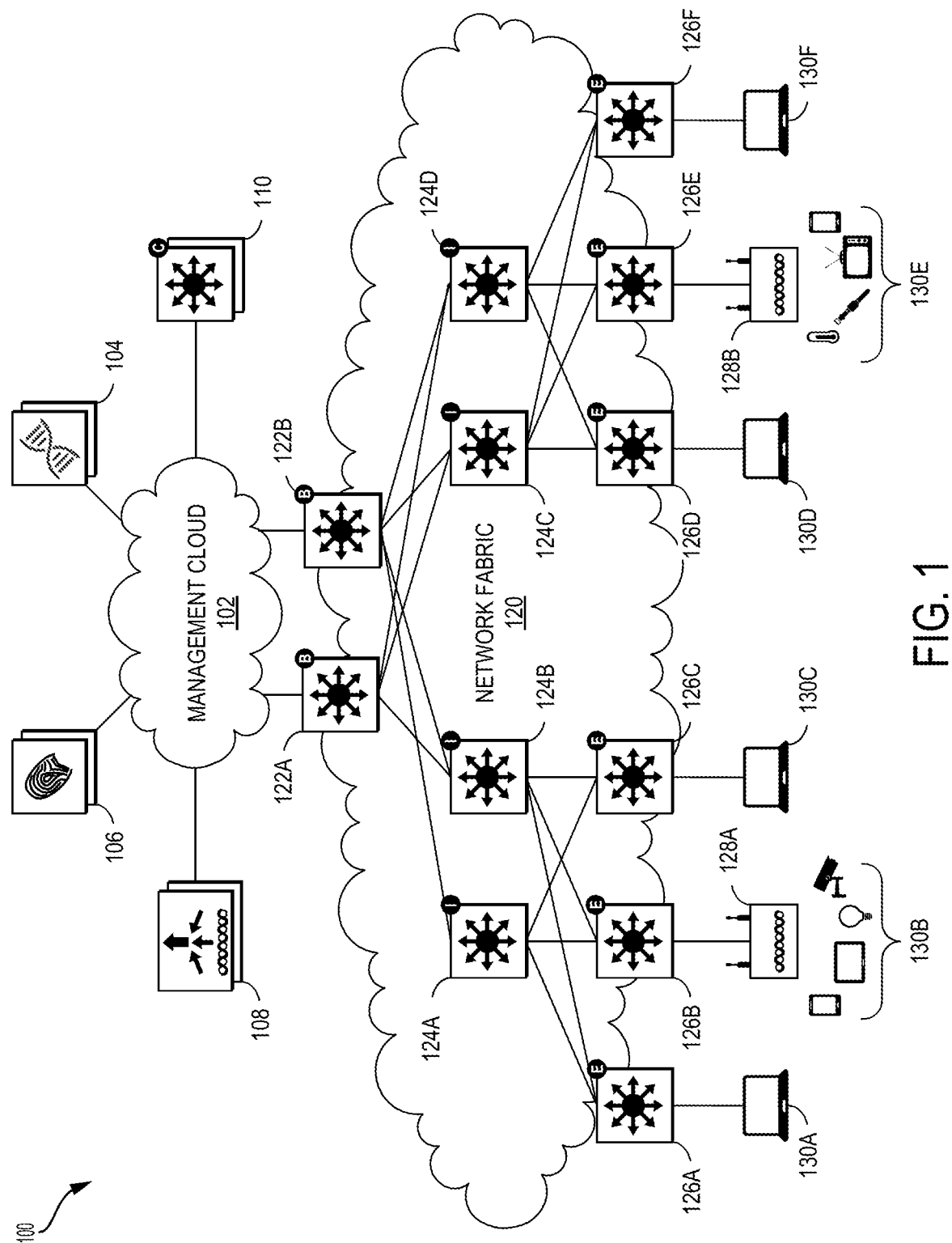
FIG. 1 illustrates an example of a topology of a network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable media for dynamically generating topology, time, and location based network insights. In some aspects, a method for dynamically generating topology, time, and location based network insights is provided. An example method can include determining statistical changes in time series data associated with a network, the time series data including a series of data points associated with one or more network conditions or parameters; determining a period of time corresponding to one or more of the statistical changes in the time series data; obtaining telemetry data corresponding to one or more segments of the network and one or more time intervals, wherein a respective length of each of the one or more time intervals is based on a length of the period of time corresponding to the one or more of the statistical changes in the time series data; and generating, based on the telemetry data, one or more insights about the one or more segments of the network, the one or more insights identifying a trend or statistical deviation in a behavior of the one or more segments of the network during the one or more time intervals.

In some aspects, a system for dynamically generating topology, time, and location based network insights is provided. An example system can include one or more processors and at least one computer-readable storage medium having stored therein instructions which, when executed by the one or more processors, cause the system to determine statistical changes in time series data associated with a network, the time series data including a series of data points associated with one or more network conditions or parameters; determine a period of time corresponding to one or more of the statistical changes in the time series data; obtain telemetry data corresponding to one or more segments of the network and one or more time intervals, wherein a respective length of each of the one or more time intervals is based on a length of the period of time corresponding to the one or more of the statistical changes in the time series data; and generate, based on the telemetry data, one or more insights about the one or more segments of the network, the one or more insights identifying a trend or statistical deviation in a behavior of the one or more segments of the network during the one or more time intervals.

In some aspects, a non-transitory computer-readable storage medium for dynamically generating topology, time, and location based network insights is provided. An example non-transitory computer-readable storage medium can include instructions stored therein which, when executed by one or more processors, cause the one or more processors to determine statistical changes in time series data associated with a network, the time series data including a series of data points associated with one or more network conditions or parameters; determine a period of time corresponding to one or more of the statistical changes in the time series data; obtain telemetry data corresponding to one or more segments of the network and one or more time intervals, wherein a respective length of each of the one or more time intervals is based on a length of the period of time corresponding to the one or more of the statistical changes in the time series data; and generate, based on the telemetry data, one or more insights about the one or more segments of the network, the one or more insights identifying a trend or statistical deviation in a behavior of the one or more segments of the network during the one or more time intervals.

In some aspects, the example method, system, and computer-readable storage medium described above can include modifying one or more aspects of the network based on the one or more insights about the one or more segments of the network. In some examples, modifying the one or more aspects of the network can include modifying one or more configuration settings associated with the network or the one or more segments of the network, deploying one or more devices on the network, and/or removing one or more devices on the network.

In some aspects, the telemetry data in the example method, system, and computer-readable storage medium described above can include key performance indicators (KPIs) and the statistical deviation in the behavior of the one or more segments of the network can include a threshold deviation in one or more KPIs. Moreover, in some examples, generating the one or more insights about the one or more segments of the network can include comparing the telemetry data corresponding to the one or more segments of the network and the one or more time intervals with historical network telemetry data associated with the one or more segments of the network and/or one or more different segments of the network and, based on a comparison result, identifying the trend or statistical deviation in the behavior of the one or more segments of the network during the one or more time intervals.

In other examples, generating the one or more insights about the one or more segments of the network can include comparing the telemetry data corresponding to the one or more segments of the network and the one or more time intervals with historical network telemetry data associated with one or more other segments of the network and, based on a comparison result, identifying the trend or statistical deviation in the behavior of the one or more segments of the network during the one or more time intervals.

In some aspects, the trend or statistical deviation in the behavior of the one or more segments of the network can identify a plurality of statistical deviations in the behavior of the one or more segments of the network during a plurality of time intervals. In some examples, the respective length of each of the plurality of time intervals can be based on the length of the period of time corresponding to the one or more of the statistical changes in the time series data.

In some aspects, the example method, system, and computer-readable storage medium described above can determining a severity of each of the plurality of statistical deviations in the behavior of the one or more segments of the network, and ranking the plurality of statistical deviations in the behavior of the one or more segments of the network based on the severity of each of the plurality of statistical deviations in the behavior of the one or more segments of the network. Moreover, in some cases, the severity of each of the plurality of statistical deviations can be determined based on a respective distance between a distribution of a respective set of KPI values associated with each of the plurality of time intervals and/or a kind of KPI metric associated with each KPI value in the respective set of KPI values.

In some cases, determining the severity of each of the plurality of statistical deviations in the behavior of the one or more segments of the network can include applying a respective weight to each KPI value in the respective set of KPI values to yield weighted KPI values, and determining the severity of each of the plurality of statistical deviations based on the weighted KPI values.

In some aspects, generating the one or more insights about the one or more segments of the network can include calculating weighted insight parameters associated with the one or more segments of the network and/or the one or more different segments of the network, comparing the weighted insight parameters and, based on a comparison result, identifying the statistical deviation in the behavior of the one or more segments of the network during the one or more time intervals. In some examples, the weighted insight parameters can be calculated by applying respective weights to network parameters in the telemetry data or historical network telemetry data associated with the one or more segments of the network and/or the one or more different segments of the network; and/or location parameters identifying the one or more segments of the network and/or the one or more different segments of the network.

This overview is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

Example Embodiments

Intent-based networking is an approach for overcoming various deficiencies of computer networks. Intent-based networking enables a user to describe in plain language what the user wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network.

As an intent-based network becomes aware of the users, devices, and elements in the network, it can automatically apply security permissions and service levels in accordance with the privileges and quality of experience (QoE) assigned to the users, devices, and elements. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |

TABLE 1-continued

Examples of Intents and Associated Workflows

| Intent | Workflow |
| --- | --- |
| I need to deploy a secure multi-tier application | Provision multiple networks and subnets; configure access control lists (ACLs) and firewall rules; advertise routing information |

In other non-limiting example use cases, an intent-based network can learn the performance needs of applications and services and adapt the network to achieve specific service levels; discover and identify devices and things as they connect, assign security and micro-segmentation profiles according to established policies, and monitor access point performance to adjust for QoE; allow users to move freely with their devices among network segments and automatically connect with the correct security and access privileges; configure network devices remotely (by a user or the network) via a management console with policies as defined by the intents for the specific location (e.g., permanent employee access, visiting employee access, guest access, etc.); and monitor and analyze network traffic and connections, compare activity against pre-defined intents such as application performance or security policies, detect malware intrusions in encrypted traffic and automatically isolate infected devices, and provide a historical record of network events for analysis and troubleshooting.

The approaches herein can provide network-wide insights as well as location or area-specific insights identifying long and/or short-term trends in a network, such as an intent-based network, an enterprise network and/or any other network. In some examples, the approaches herein can dynamically generate network insights across segments (physical and/or logical) of a network (and/or the entire network) for long (e.g., monthly, yearly, etc.) and/or short (e.g., hourly, daily, weekly) time-scales. The network insights can identify trends in the network (e.g., the network as a whole and/or the segment(s) of the network), such as deviations from a typical or normal behavior of the network as a whole and/or the segment(s) of the network. Such network trends can indicate a systemic issue pointing to an underlying problem affecting the network (or a portion of the network), or can be the result of a planned change, such as a modification in the network configuration or an installation of new devices in a particular location (e.g., physical or logical) in the network.

The approaches herein can generate network insights at specific time intervals by comparing a segment(s) of the network (e.g., a building, a floor, a virtual local area network (VLAN), etc.) with itself and/or with other segment(s) of the network. For example, the network insights can be generated by comparing telemetry data (e.g., key performance indicators) identifying a state of the segment(s) of the network at a specific time interval(s) with 1) historical telemetry data identifying a historical state of the segment(s) of the network, 2) telemetry data identifying a state of other segment(s) of the network at the specific time interval(s), and/or 3) historical telemetry data identifying a historical state of the other segment(s) of the network.

In some cases, the time interval(s) for generating insights can be dynamically generated based on the behavior of the network by analyzing statistical changes in a time series of one or more key performance indicators (KPIs) of interest, such as throughput, interference, resource or network utilization, latency, jitter, client counts, error rates, etc. In some examples, the time interval(s) can be dynamically generated using a change-point detection technique to determine change points where the behavior of the network is markedly or statistically different before and after the change point.

The change points can be natural markers for determining the time interval(s) for insight generation. In some examples, a change point can identify one or more points in time when a distribution of KPI values changes markedly or statistically. Furthermore, in some cases, change points can be determined when a section of the network undergoes a change in the behavior of a KPI. These change points, in turn, can define time intervals over which to generate insights for the aforementioned section of the network.

In some cases, deviations in the behavior of the network or a segment(s) of the network can be computed based on weighted parameters, such as weighted KPIs and/or other weighted parameters such as weighted location parameters specifying particular segment(s) of the network. In some cases, the deviations can be ranked according to a determined severity of each deviation to provide contextual information on the insights. The severity can be calculated based on, for example, a distance of a distribution of KPI values and the type of KPI values.

Figure 6:
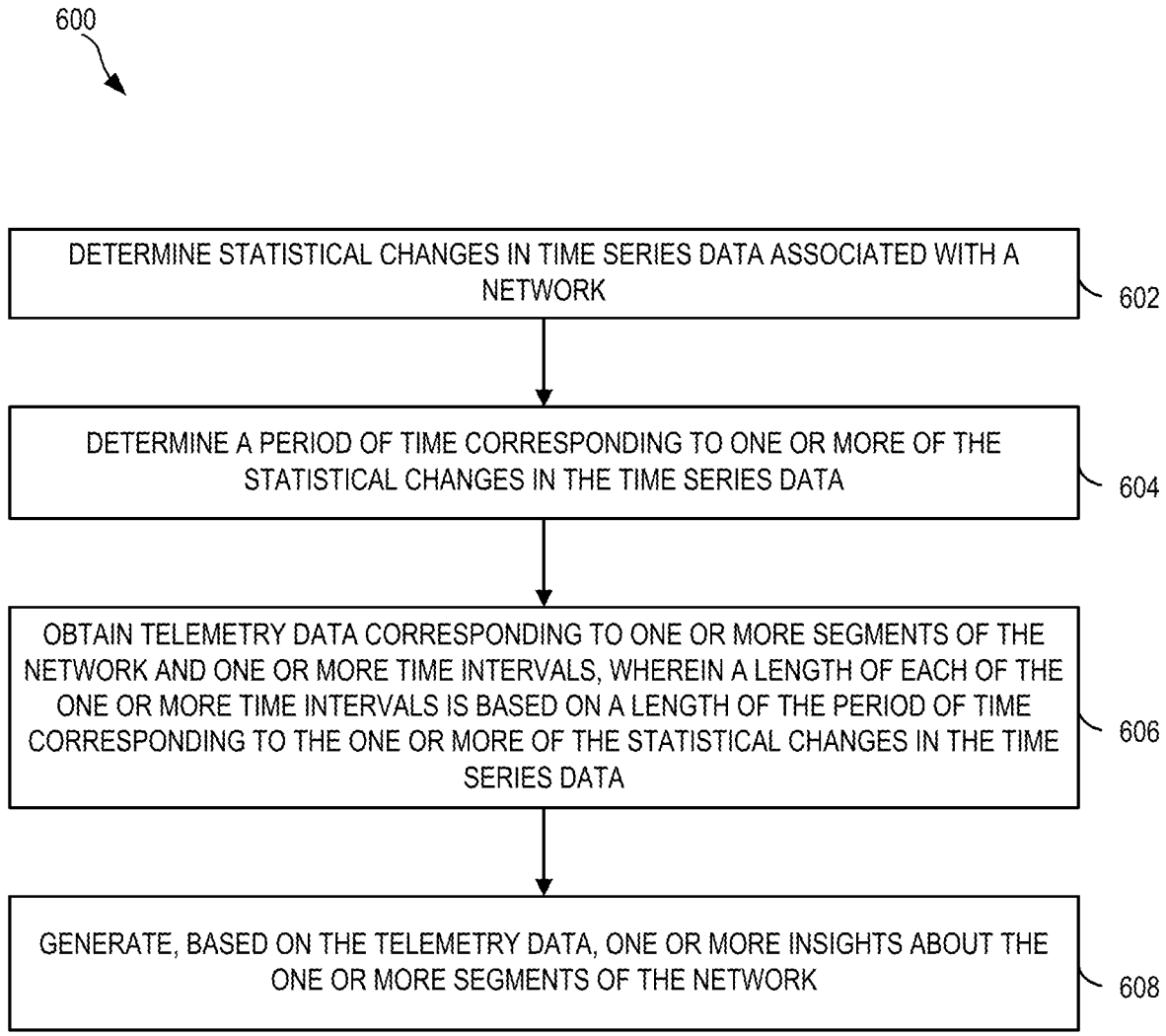
FIG. 6 illustrates an method for dynamically generating topology, time, and location based network insights, in accordance with some examples.
Figure 7:
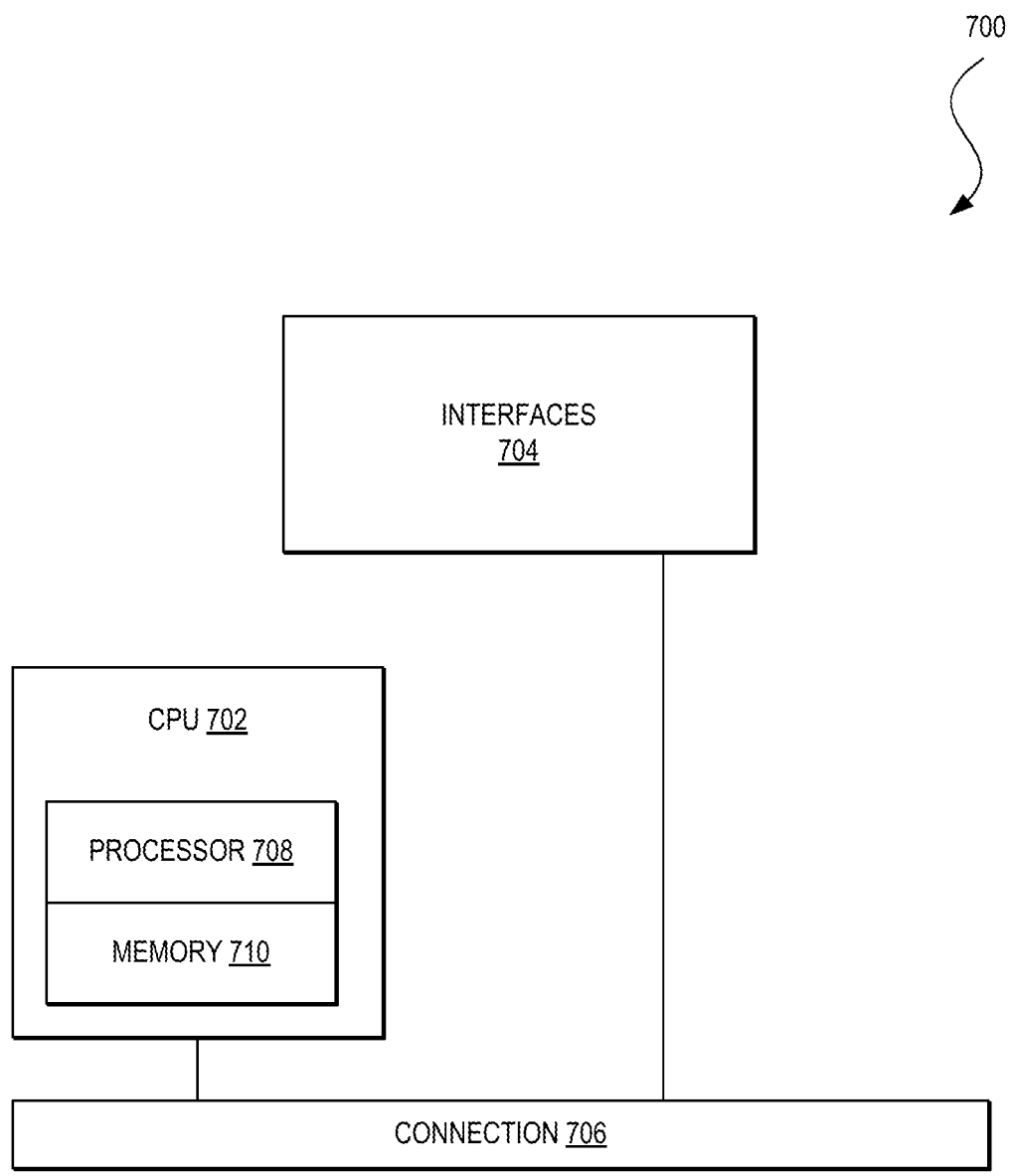
FIG. 7 illustrates an example network device in accordance with some examples.
Figure 8:
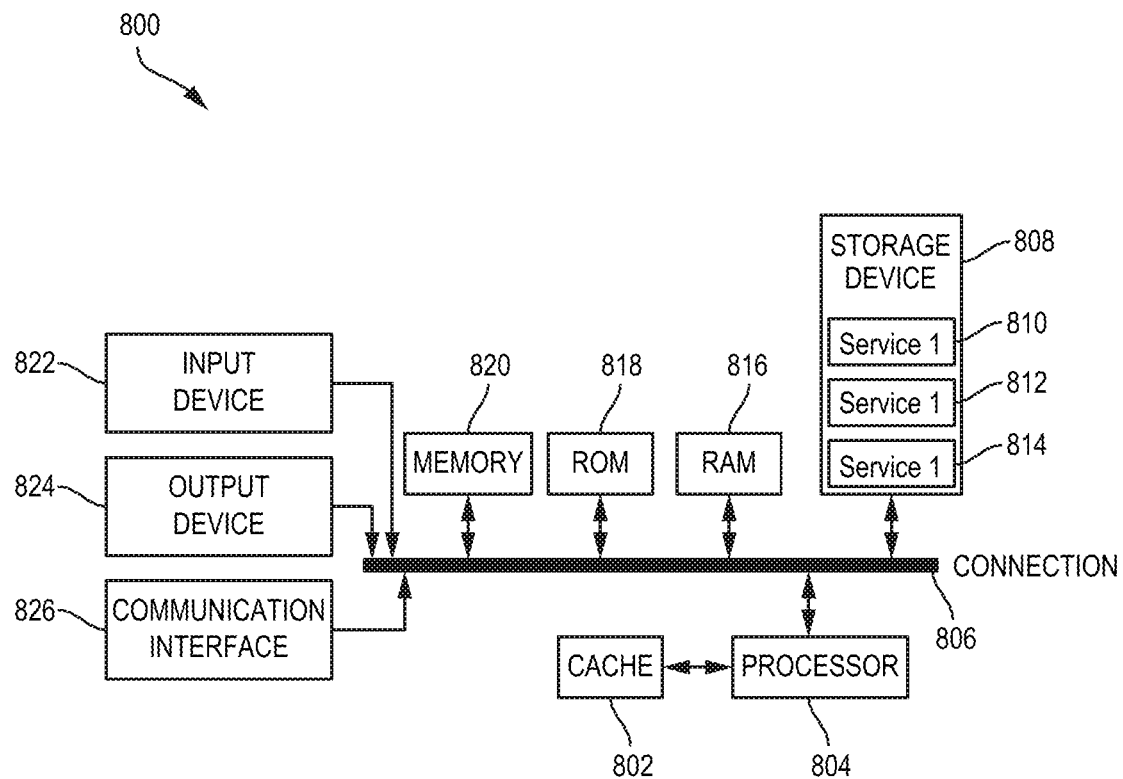
FIG. 8 illustrates an example computing device architecture in accordance with some examples.

Disclosed are systems, methods, and computer-readable media for dynamically generating topology, time, and location based network insights. The present technologies will be described in more detail in the following disclosure as follows. The discussion begins with a description of example networks, systems, and interfaces for dynamically generating network insights, as illustrated in FIGS. 1 through 5C. A description of an example method and techniques for dynamically generating topology, time, and location based network insights, as illustrated in FIG. 6, will then follow. The discussion concludes with a description of an example network device and an example computing device architecture, as illustrated in FIGS. 7 and 8, including example hardware components suitable for performing various networking and computing operations described herein.

The disclosure now turns to FIG. 1, which illustrates an example of a topology of a network 100 for providing intent-based networking. It should be understood that, for the network 100 and any network discussed herein, there can be additional or fewer nodes, devices, links, networks, or components in similar or alternative configurations. Other example implementations with different numbers and/or types of endpoints, nodes, cloud components, servers, software components, devices, virtual or physical resources, configurations, topologies, services, or deployments are also contemplated herein. Further, the network 100 can include any number or type of resources, which can be accessed and utilized by endpoints or network devices. The illustrations and examples provided herein are for clarity and simplicity.

In this example, the network 100 can include a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configurations and policy distribution, as well as device management and analytics. The management cloud 102 can include one or more network controller appliances 104; one or more authentication, authorization, and accounting (AAA) appliances 106; one or more wireless local area network controllers (WLCs) 108; and one or more fabric control plane nodes 110. In other examples, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some examples, one or more Cisco Digital Network Architecture (Cisco DNA™) appliances can operate as the network controller appliance(s) 104. Moreover, in some examples, the network controller appliance(s) 104 can perform analytics and assurance operations.

The AAA appliance(s) 106 can control access to computing resources, facilitate enforcement of network policies, audit usage, and provide information to bill for services. The AAA appliance can interact with the network controller appliance(s) 104 and databases and directories containing information for users, devices, things, policies, billing, and other information to provide authentication, authorization, and accounting services. In some examples, the AAA appliance(s) 106 can utilize Remote Authentication Dial-In User Service (RADIUS) or Diameter to communicate with devices and applications. In some cases, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some examples, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some examples, one or more Cisco® Wireless Controllers, Cisco® Wireless LAN, and/or other Cisco DNA™-ready wireless controllers can operate as the WLC(s) 108.

The network fabric 120 can include border nodes 122A and 122B (collectively "122"), intermediate nodes 124A-D (collectively "124"), and edge nodes 126A-F (collectively "126"). Although the control plane node(s) 110 are shown to be external to the network fabric 120 in this example, in other examples, the control plane node(s) 110 can be co-located with the network fabric 120. In examples where the control plane node(s) 110 are co-located with the network fabric 120, the control plane node(s) 110 can include a dedicated node or set of nodes, or the functionality of the control node(s) 110 can be implemented by the border nodes 122.

The control plane node(s) 110 can serve as a central database for tracking users, devices, and things as they attach to the network fabric 120 and as they roam around. The control plane node(s) 110 can allow network infrastructure (e.g., switches, routers, WLCs, etc.) to query the database to determine the locations of users, devices, and things attached to the fabric instead of using a flood and learn mechanism. In this manner, the control plane node(s) 110 can operate as a single source of truth about where every endpoint attached to the network fabric 120 is located at any point in time. In addition to tracking specific endpoints (e.g., /32 address for IPv4, /128 address for IPv6, etc.), the control plane node(s) 110 can track larger summarized routers (e.g., IP/mask). This flexibility can help summarization across fabric sites and improve overall scalability.

The border nodes 122 can connect the network fabric 120 to traditional Layer 3 networks (e.g., non-fabric networks) or to different fabric sites. The border nodes 122 can translate context (e.g., user, device, or thing mapping and identity) from one fabric site to another fabric site or to a traditional network. When the encapsulation is the same across different fabric sites, the translation of fabric context is generally mapped 1:1. The border nodes 122 can also exchange reachability and policy information with control plane nodes of different fabric sites. The border nodes 122 can provide border functions for internal networks and external networks. Internal borders can advertise a defined set of known subnets, such as those leading to a group of branch sites or a data center. External borders, on the other hand, can advertise unknown destinations (e.g., to the Internet similar in operation to the function of a default route).

The intermediate nodes 124 can operate as Layer 3 forwarders that connect the border nodes 122 to the edge nodes 126 and provide the Layer 3 underlay for fabric overlay traffic.

The edge nodes 126 can connect endpoints to the network fabric 120 and can encapsulate/decapsulate and forward traffic from these endpoints to and from the network fabric. The edge nodes 126 may operate at the perimeter of the network fabric 120 and can be the first points for attachment of users, devices, and things and the implementation of policy. In some examples, the network fabric 120 can include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the edge nodes via Layer 2. Devices or things connected to the fabric extended nodes can use the edge nodes 126 for communication to outside subnets.

In this example, the network fabric can represent a single fabric site deployment which can be differentiated from a multi-site fabric deployment as discussed further below with respect to FIG. 3.

In some examples, the subnets hosted in a fabric site can be provisioned across every edge node 126 in that fabric site. For example, if the subnet 10.10.10.0/24 is provisioned in a given fabric site, this subnet may be defined across all of the edge nodes 126 in that fabric site, and endpoints located in that subnet can be placed on any edge node 126 in that fabric. This can simplify IP address management and allow deployment of fewer but larger subnets. In some examples, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The network 100 can also include wired endpoints 130A, 130C, 130D, and 130F and wireless endpoints 130B and 130E (collectively "130"). The wired endpoints 130A, 130C, 130D, and 130F can connect by wire to edge nodes 126A, 126C, 126D, and 126F, respectively, and the wireless endpoints 130B and 130E can connect wirelessly to wireless access points 128B and 128E (collectively "128"), respectively, which in turn can connect by wire to edge nodes 126B and 126E, respectively. In some examples, Cisco Aironet® access points, Cisco Meraki® MR access points, and/or other Cisco DNA™-ready access points can operate as the wireless access points 128.

The endpoints 130 can include computing devices such as servers, workstations, desktop computers, gaming systems, conferencing systems, mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, etc.); connected cars and other vehicles; smart home sensors and devices (e.g., alarm systems, security cameras, lighting, appliances, media players, HVAC equipment, utility meters, doors, locks, etc.); unmanned aerial vehicles (UAVs); office equipment (e.g., desktop phones, copiers, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, etc.); transportation and logistical equipment (e.g., turnstiles, rental car trackers, navigational devices, inventory monitors, etc.); and so forth.

In some examples, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about wired and wireless endpoints in the network fabric 120, and can serve as the source of truth for endpoints connected to the network fabric. For data plane integration, the WLC(s) 108 can instruct the wireless access points 128 to form an overlay tunnel (e.g., VXLAN) to their adjacent edge nodes 126. The tunnel can carry segmentation and policy information to and from the edge nodes 126, allowing connectivity and functionality identical or similar to that of a wired endpoint. When the wireless endpoints 130 join the network fabric 120 via the wireless access points 128, the WLC(s) 108 can onboard the endpoints into the network fabric 120 and inform the control plane node(s) 110 of the endpoints' Media Access Control (MAC) addresses. The WLC(s) 108 can then instruct the wireless access points 128 to form overlay tunnels to the adjacent edge nodes 126. The wireless endpoints 130 can obtain IP addresses for themselves via Dynamic Host Configuration Protocol (DHCP). Once that completes, the edge nodes 126 can register the IP addresses of the wireless endpoints 130 to the control plane node(s) 110 to form a mapping between the endpoints' MAC and IP addresses, and traffic to and from the wireless endpoints 130 can begin to flow.

Figure 2:
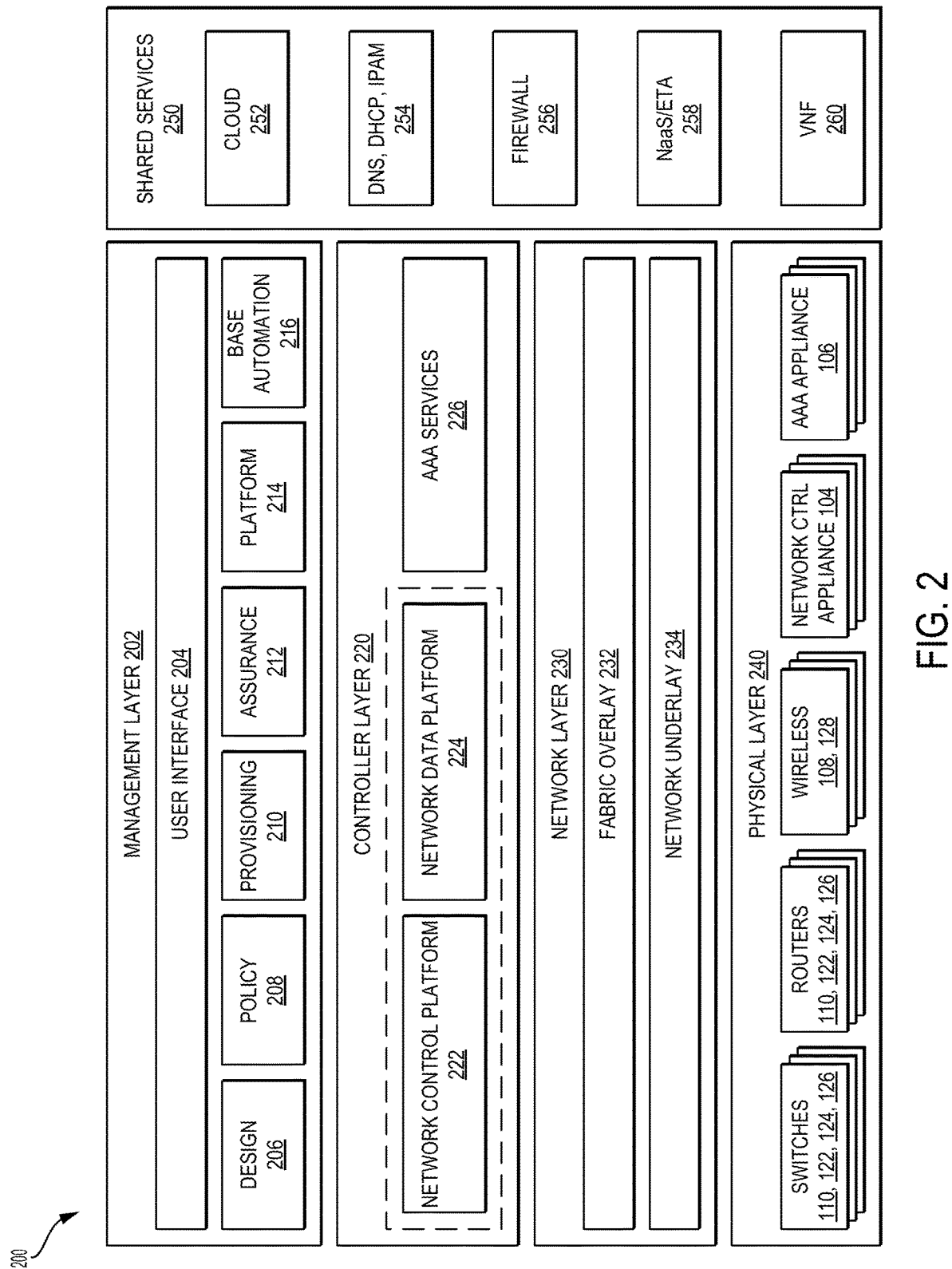
FIG. 2 illustrates an example of a logical architecture for an enterprise network in accordance with some examples.

FIG. 2 illustrates an example of a logical architecture 200 for a network (e.g., the network 100). One of ordinary skill in the art will understand that, for the logical architecture 200 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the logical architecture 200 includes a management layer 202, a controller layer 220, a network layer 230 (such as embodied by the network fabric 120), a physical layer 240 (such as embodied by the various elements of FIG. 1), and a shared services services layer 250. The management layer 202 can abstract the complexities and dependencies of other layers and provide a user with tools and workflows to manage a network (e.g., the network 100). The management layer 202 can include a user interface 204, design functions 206, policy functions 208, provisioning functions 210, assurance functions 212, platform functions 214, and base automation functions 216.

The user interface 204 can provide a user a point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 can also provide visibility information, such as views of a network, network infrastructure, computing devices, and things. For example, the user interface 204 can provide a view of the status or conditions of the network, operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some examples, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

The controller layer 220 can include subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers (230, 240). For example, the network control platform 230 can provide the design functions 206, the policy functions 208, and the provisioning functions 210. In addition, the network control platform 222 can include tools and workflows for discovering switches, routers, wireless controllers, and other network infrastructure devices; maintaining network and endpoint details, configurations, and software versions; Plug-and-Play (PnP) for automating deployment of network infrastructure, Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others.

The network control platform 222 can communicate with network elements using, for example and without limitation, Network Configuration (NETCONF)/Yet Another Next Generation (YANG), Simple Network Management Protocol (SNMP), Secure Shell (SSH)/Telnet, and so forth. In some examples, the Cisco® Network Control Platform (NCP) can operate as the network control platform 222.

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices including, for example, syslog, SNMP, NetFlow, Switched Port Analyzer (SPAN), and streaming telemetry, among others. The network data platform 224 can also collect and use contextual information from the network control platform 222, the shared services 250, among others.

In some examples, one or more appliances, such as one or more Cisco DNA™ Center appliances, can provide the functionalities of the management layer 210, the network control platform 222, and the network data platform 224. The appliances (e.g., Cisco DNA™ Center appliances) can support horizontal scalability by adding additional nodes (e.g., Cisco DNA™ Center nodes) to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third-party vendors. In some cases, the appliances (e.g., Cisco DNA™ Center appliances) can be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and create group-based policies and contracts. The AAA services 226 can identify and profile network infrastructure devices and endpoints using, for example, AAA/RADIUS, 802.1X, MAC Authentication Bypass (MAB), web authentication, and EasyConnect, among others. The AAA services 226 can collect and use contextual information from the network control platform 222, the network data platform 224, and the shared services 250, among others. In some examples, Cisco® ISE can provide the AAA services 226.

The network layer 230 can be conceptualized as a composition of two layers, an underlay 234 including physical and virtual network infrastructure (e.g., routers, switches, WLCs, etc.) and a Layer 3 routing protocol for forwarding traffic, and an overlay 232 including a virtual topology for logically connecting wired and wireless users, devices, and things and applying services and policies to these entities. Network elements of the underlay 234 can establish connectivity between each other, such as via Internet Protocol (IP). The underlay 234 can use any topology and routing protocol.

In some examples, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the protocol and network address configurations to the physical network infrastructure. In some examples, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some examples, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some examples, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement overlay/tunnel (e.g., VXLAN) encapsulation to provide network segmentation by using the virtual network identifier (VNI) and Scalable Group Tag (SGT) fields in packet headers. The network fabric 120 can support macro-segmentation and micro-segmentation.

Macro-segmentation logically separates a network topology into smaller virtual networks by using a unique network identifier and separate forwarding tables. This can be instantiated as a virtual routing and forwarding (VRF) instance, for example, and referred to as a virtual network (VN). A VN is a logical network instance within the network fabric 120 defined by a Layer 3 routing domain and can provide both Layer 2 and Layer 3 services (e.g., using the VXLAN VNI to provide both Layer 2 and Layer 3 segmentation).

Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some examples, the control plane node 110 can implement the Locator/Identifier Separation Protocol (LISP) to communicate with one another and with the management cloud 102. Thus, the control plane nodes 110 can operate a host tracking database, a map server, and a map resolver. The host tracking database can track the endpoints 130 connected to the network fabric 120 and associate the endpoints to the edge nodes 126, thereby decoupling an endpoint's identifier (e.g., IP or MAC address) from its location (e.g., closest router) in the network.

The physical layer 240 can include network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 3:
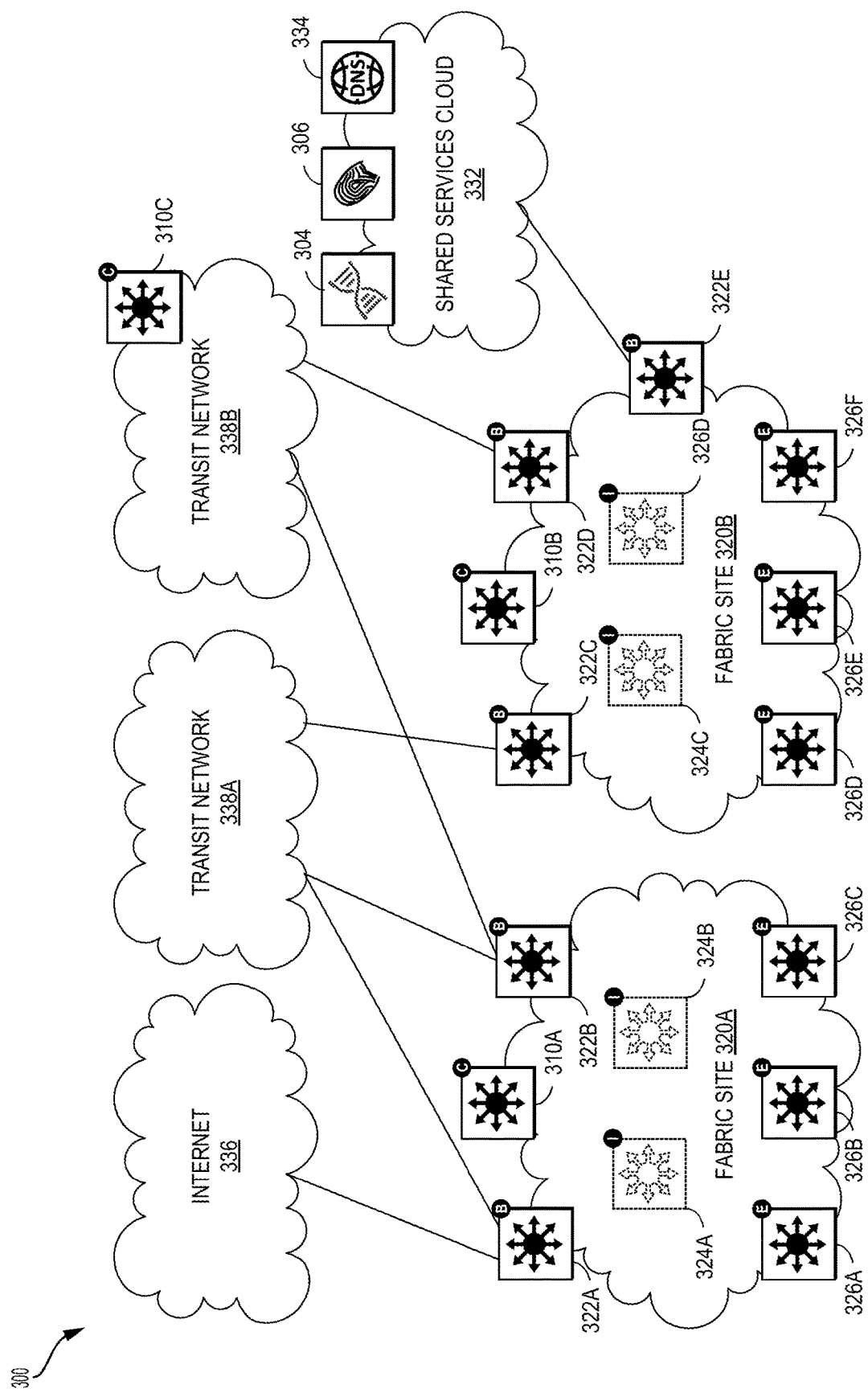
FIG. 3 illustrates an example of a topology of a multi-site network in accordance with some examples.

FIG. 3 illustrates an example of a topology of a multi-site network 300. In this example, the network fabric includes fabric sites 320A and 320B. The fabric site 320A can include a control node 310A, border nodes 322A and 322B, intermediate nodes 324A and 324B (shown here in dashed line and not connected to the border nodes or the edge nodes for simplicity), and edge nodes 326A-D. The fabric site 320B can include a fabric control node 310B, border nodes 322C-E, intermediate nodes 324C and 324D, and edge nodes 326D-F. Multiple fabric sites corresponding to a single fabric, such as the network fabric of FIG. 3, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 336, traditional WAN 338A, Software-Defined WAN (SD-WAN) (not shown), or Software-Defined Access (SD-Access) 338B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network can carry endpoint context information (e.g., VRF, SGT) across the network. Otherwise, a re-classification of the traffic can be needed at the destination site border.

The local control plane in a fabric site may hold state relevant to endpoints that are connected to edge nodes within the local fabric site. The local control plane can register local endpoints via local edge nodes, as with a single fabric site (e.g., the network fabric 120). An endpoint that is not explicitly registered with the local control plane may be assumed to be reachable via border nodes connected to the transit network. In some examples, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 300 can also include a shared services cloud 332. The shared services cloud 332 can include one or more network controller appliances 304, one or more AAA appliances 306, and other shared servers (e.g., DNS; DHCP; IPAM; SNMP and other monitoring tools; NetFlow, syslog, and other data collectors, etc.). These shared services can generally reside outside of the network fabric and in a global routing table (GRT) of an existing network. In this case, some method of inter-VRF routing may be performed. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may involve complex distribute-lists and prefix-lists to prevent loops.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are used (e.g., a Shared Services VN, an Internet VN, a data center VN, etc.).

Figure 4:
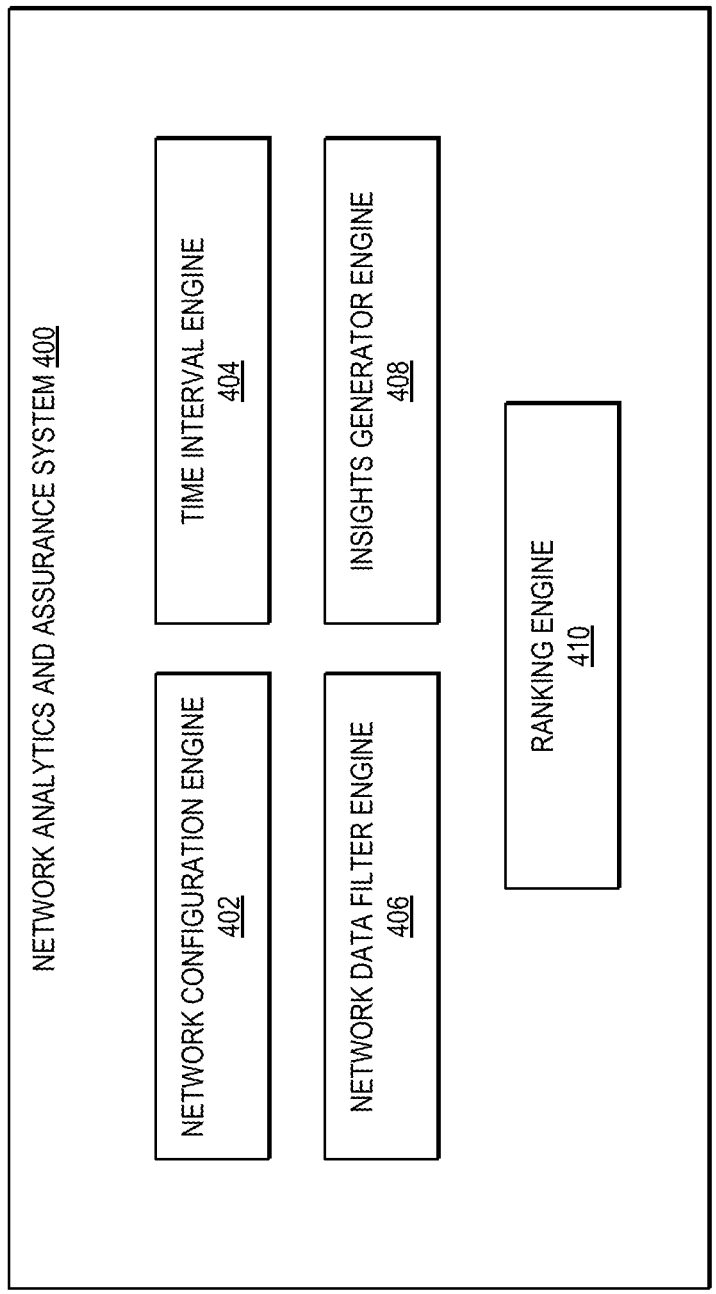
FIG. 4 illustrates an example network analytics and assurance system for generating network insights, in accordance with some examples.

FIG. 4 illustrates an example network analytics and assurance system 400 for generating network insights. The network analytics and assurance system (NAAS) 400 can generate insights on a network such as network 100 or network 300 shown in FIGS. 1 and 3, respectively. Moreover, the NAAS 400 can be implemented by one or more network devices and/or appliances. For example, in some cases, the NAAS 400 can be implemented by one or more network controller appliances (e.g., 104, 304). In this example, the NAAS 400 includes a network configuration engine 402, a time interval engine 404, a network data filter engine 406, an insights generator engine 408, and a ranking engine 410.

The network configuration engine 402 can determine a network configuration and/or a time scale for generating insights for a network (e.g., 100, 300). In some examples, the network configuration engine 402 can analyze the entire topology of the network (e.g., 100, 300) at once over a time scale, such as a long time scale (e.g., a month, a year, etc.) or a short time scale (e.g., an hour, a day, a week, etc.), to generate insights for the entire network topology and time scale.

In other examples, a user can configure the network granularity on which to generate insights. The user can configure such network granularity on the network configuration engine 402. For example, the user may want to compare geographically distinct sites, a floor with another floor in the same building, etc. The user can thus configure this information on the network configuration engine 402, which can provide such information to the NAAS 400 generate network insights based on that information.

In yet other examples, the user can define a configuration in the network configuration engine 402, which provides for a sub-section of the network (e.g., a building, a floor, a department, a virtual network, etc.) to be compared with itself over time. The user can also configure a time scale on which to generate insights, with the option of near real-time insight generation.

In other examples, the network configuration engine 402 can generate the configuration parameters for generating insights or pull such parameters from a policy manager. For example, the network configuration engine 402 can dynamically determine one or more configuration parameters to use for generating insights, such as a specific scope of the analysis and/or insights (e.g., a specific network topology or location, a specific network segment, one or more specific devices, the entire network, etc.), a specific condition or metric to collect and/or analyze for generating insights, etc.

The time interval engine 404 can determine and/or manage the time interval(s) over which insights are generated. In some examples, the time interval can be predefined or set to a fixed interval of time (e.g., hours, days, weeks, months, etc.). In other examples, the time interval can be prescribed by a user. In some cases, a user can define a specific time interval on demand. For example, a user can set a time interval corresponding to a network configuration change to measure the impact of the network configuration change.

In some examples, the time interval engine 404 can dynamically determine the time interval for generating insights. For example, the time interval engine 404 can dynamically determine a time interval for generating insights based on a behavior of the network. The time interval engine 404 can analyze statistical changes in a time series of specific metrics, such as specific key performance indicators (KPIs), to identify a behavior of the network and/or dynamically determine a time interval for generating insights. Non-limiting examples of KPIs or metrics which the time interval engine 404 can use to dynamically determine a time interval for generating insights can include, without limitation, throughput, interference, availability/uptime, latency, jitter, error rate, utilization, dynamic trending, service level agreements (SLA), connectivity, health, performance, signal-to-noise ratio (SNR), client or device counts, QoE parameters, QoS parameters, packet loss, network load, etc.

In some examples, the time interval engine 404 can dynamically determine a time interval for generating insights based on detected "change points" which, in some cases, can be natural markers for determining the time interval for insight generation. A change point can represent a period where the behavior of the network has changed (e.g., before and after the change point). In some example, a change point can be identified based on statistical, performance, configuration, physical, and/or any other changes that affect the state and/or behavior of the network (e.g., in comparison to before and after the change point).

In some cases, a change point can identify points in time when the distribution of one or more KPIs has changed above a threshold, which can vary based on the network, user preferences, type of KPIs, etc. As previously noted, this can be a natural time interval over which to generate insights. Furthermore, in some examples, change points can be determined when a section of the network undergoes a change in the behavior or state of one or more KPIs. These change points can in turn be used to define the time intervals over which to generate insights for that section of the network.

The time interval engine 404 can implement various techniques to detect change points in the network. For example, in some cases, the time interval engine 404 can perform online change point detection which can be used for incoming data in a live system. Non-limiting examples of change point techniques that the time interval engine 404 can implement include cumulative sum, change finder, density-ratio estimation, etc.

In some cases, the detected change points may not be uniformly spaced in time. However, in such cases, the time interval engine 404 can uniformize the intervals to the closest value in specific units such as hours, days or weeks, so as to render results at a uniform time interval.

In other examples, the time interval engine 404 can dynamically determine a time interval for generating insights based on a detected condition of the network during a particular period of time. For example, assume a store has a network running a wireless access point for customers to use to connect to the store's network. Assume the store has a sale or some event that attracts a large number of customers to the store, and this large increase in the number of customers causes a sudden spike in the number of clients that connect to the network (e.g., via the wireless access point). Such a sudden spike in the number of clients connected to the network can cause a marked drop in the throughput of the network and a large spike in client counts on the network. Such a drop in throughput and spike in client counts would likely be a temporal condition which may end after the store sale or event that drove the large spike in customers. Moreover, the fluctuations in the throughput and client counts on the network can be reflected by a fluctuation in KPIs, such as a throughput KPI and a client KPI.

The time interval engine 404 can perform a change point or deviation analysis by, for example, computing the mean of these KPIs across a period of time. Assume that for the first few days before the sale or event the store had ten (10) customers and then suddenly on the day of the sale or event the number of customers rose to fifty (50) customers. Here, the time series data for the throughput and client count KPI averages would reflect a distinct spike at the time the sale or event started and a distinct drop at the time the sale or event ended. The time interval engine 404 can then define the period from the spike to the drop in the KPI averages as the time interval for insight analysis. Thus, the time interval engine 404 can dynamically determine, based on the time series data, that there was a spike on a certain day and a drop a few days later, and use that period as the time interval for doing the insight analysis. In some cases, the time interval engine 404 can also define a time interval for the periods of time before and after the spike and drop, which can be used to perform a comparison for the KPIs across these time intervals of interest.

The network data filter engine 406 can take the configuration from the network configuration engine 402 and the time interval engine 404 as input, and define the data format in the pre-defined time window (e.g., hourly, daily, weekly, monthly, etc.) to generate insights. The network data filter engine 406 can also handle or correct missing data by inputting or discarding values, for example. The network data filter engine 406 can also deal with data quality issues by, for example, correcting the data quality issues, discarding data with quality issues, updating the data, etc. In some examples, the network data filter engine 406 can determine data handling and cleaning procedures based on a pre-defined policy and/or a user input/preference.

The insights generator engine 408 can include a component for generating short-term insights (e.g., hours, days, etc.) and a component for generating long-term insights (e.g., weeks, months, etc.). In some cases, the insights generator engine 408 can generate insights based on data obtained from the network data filter engine 406 over predefined period of time. In some examples, such insights can be generated on specific network KPIs observed on the network.

In some cases, the insights generator engine 408 can identify short-term trends based on patterns that are transient in nature, and may not necessarily depend on historical network behavior as much as the current dynamics. In some examples, to identify short-term trends, the insights generator engine 408 can perform a multi-dimensional analysis by looking at deviations in multiple parameters at once (e.g., in addition to one or more KPIs), such as client count, interference, access point (AP) group, location information, etc. In some cases, the insights generator engine 408 can implement parameters with relative weights, and use the weighted parameters to compute deviations in the network.

In some aspects, the insights generator engine 408 can implement techniques such as principal component analysis (PCA), density-based clustering or higher-dimensional outlier detection to identify areas of the network that are problematic for certain intervals of time. Moreover, the insights generator engine 408 can implement neural networks and neural network techniques, such as autoencoders, to identify deviations in the network over time.

In some cases, the insights generator engine 408 can generate insights over a longer (e.g., monthly, etc.) period of time. The insights generator engine 408 can generate such insights or trends based on large datasets. In some examples, the insights generator engine 408 can use machine learning algorithms such as deep neural networks to generate such insights or trends. Here, the machine learning algorithm can determine deviations based on one or more KPIs at once, as previously discussed.

The ranking engine 410 can contain an updated record of prevalent trends (e.g., short term and/or long-term trends) generated by the insights generator engine 408. The ranking engine 410 can contain information on various components of the network topology (e.g., floors, buildings, sites, etc.) on which insights were recently generated. The ranking engine 410 can rank such list by the severity of the deviations. This ranking can provide contextual information on the worst-performing areas of the network in the short and long term. Furthermore, areas of the network that repeatedly have deviations can be flagged and reported as poor performers.

Figure 5A:
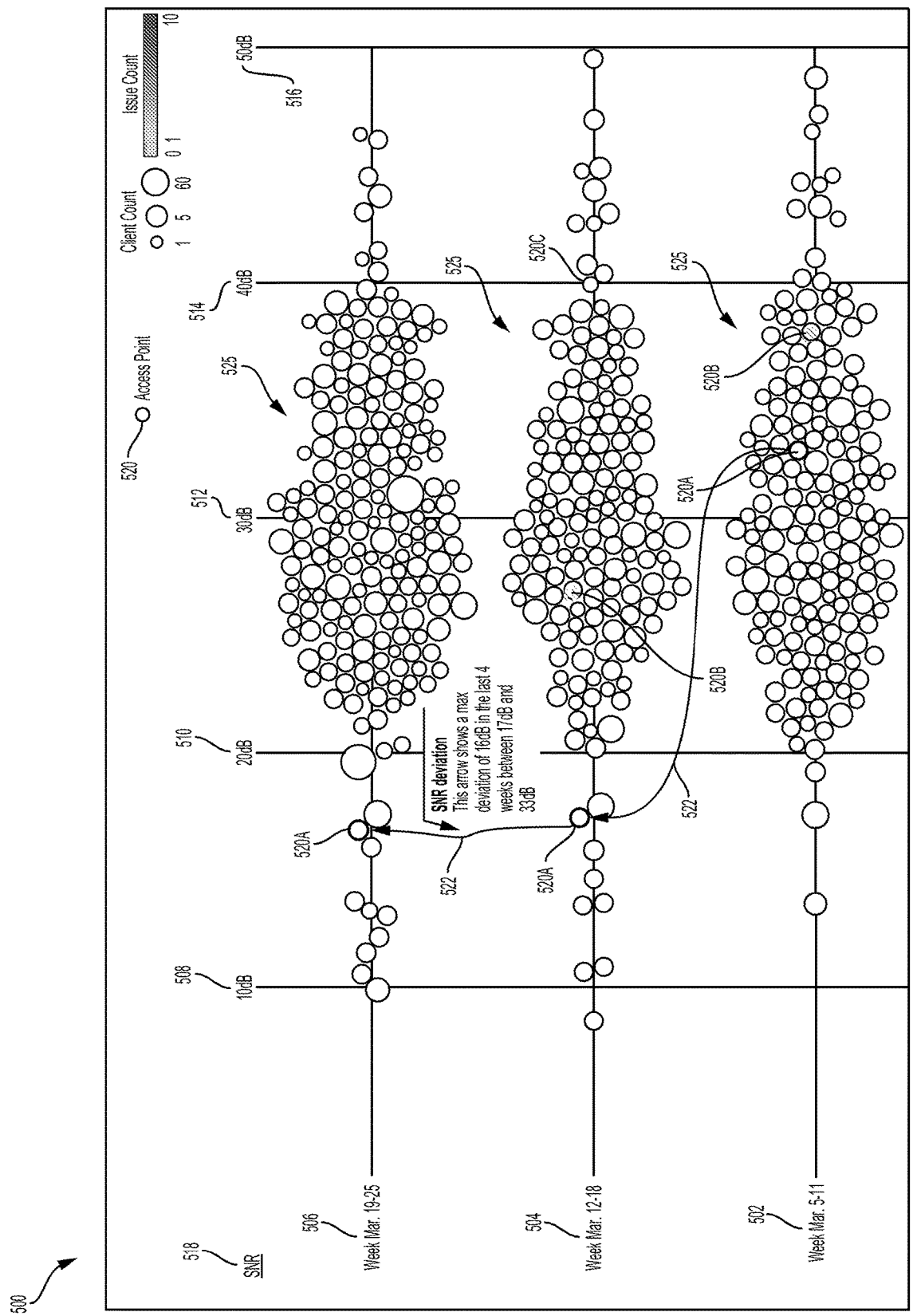
FIGS. 5A-5C illustrate example interfaces depicting insights generated by a network analytics and assurance system for different time intervals, in accordance with some examples.

FIG. 5A illustrates an example interface 500 depicting insights 525 generated by the NAAS 400 (e.g., via insights generator engine 408) for a site across different time intervals 502-506. In this example, the insights 525 depict signal-to-noise (SNR) ratios 518 calculated for access points 520 at the time intervals 502-506. To visually depict the SNR ratios 518 for the access points 520, the access points 520 are plotted, at the different time intervals 502-506, to specific decibel (db) values 508-516 along a horizontal axis (e.g., X axis) of dB values 508-516.

In this example, the location where a particular access point 520 is plotted along the axis of dB values 508-516 for a particular time interval (502, 504, 506) indicates the SNR ratio 518 calculated for that access point 520 at that particular time interval (502, 504, 506). For example, at time interval 504, the access point 520C is plotted on the dB value 514 in the axis of dB values 508-516. The dB value 514 corresponds to 40 dB. Thus, the interface 500 indicates that the NAAS 400 calculated a 40 dB SNR at time interval 504 for the access point 520C. As illustrated here, the interface 500 can visually depict the distribution of SNR ratios 518 of access points 520 in the site across the different time intervals 502-506, and identify any anomalies in the SNR ratios 518 of the access points 520 at any of the different time intervals 502-506.

The insights 525 can also include or depict a deviation 522 or trend in dB values (e.g., SNR ratios) detected for access point 520A across the different time intervals 502-506. For example, the deviation 522 shows that at time interval 502, the access point 520A had a SNR ratio between 30 dBs (512) and 40 dBs (514). The deviation 522 shows that, at time interval 504, the access point 520 had a SNR ratio between 10 dBs (508) and 20 dBs (510), which indicates a marked decrease in its SNR ratio between time interval 502 and the time interval 504. The deviation 522 also shows that, at time interval 506, the access point 520 maintained a SNR ratio between 10 dBs (508) and 20 dBs (510), which indicates that SNR ratio of the access point 520A remained largely constant between time interval 504 and time interval 506.

In interface 500, the size of the visual elements (e.g., circles) representing the access points 520 correspond to the client counts (e.g., the number of clients connected to the each access point). For example, the higher the number of client counts associated with an access point, the bigger the circle depicted in the interface 500 representing that access point. The size of the circles representing the access points 520 in the interface 500 can thus give a visual indication of their respective client counts at the various time intervals 502-506.

In some cases, the visual elements (e.g., circles) representing the access points 520 in the interface 500 can also have other characteristics or patterns to depict other attributes or conditions associated with the access points 520. For example, the circles representing the access points 520 can be colored or patterned in different ways to depict different attributes or conditions. To illustrate, access point 520B is depicted in yellow to indicate a certain number of issues (e.g., errors, failures, anomalies, configuration problems, deviations, etc.) have been detected for that access point.

In some examples, other colors can be used to depict a higher number of issues associated with an access point. For example, yellow may be used to indicate a first number or range of issues such as 1-5. If the number of issues associated with an access point is above 5, a different color, such as orange, can be used to depict a second number or range of issues, such as 6-10. If the number of issues associated with an access point is above 10, another different color, such as red, can be used to depict a third number or range of issues, such as 11-15.

Different characteristics or patterns (e.g., fill color, size, shape, fill pattern, line pattern, etc.) associated with the visual elements representing devices, such as the circles representing access points in the example of FIG. 5A, can also be used to visually indicate different degrees and/or types of attributes or conditions associated with the access points. In the previous examples, size was used to depict client counts and color (e.g., clear, yellow, etc.) was used to depict issue count. In other examples, the shape of visual elements can be used to depict the type of device (e.g., circle for access point and square for server) and the line pattern of visual elements can be used to depict an associated location of the device.

Figure 5B:
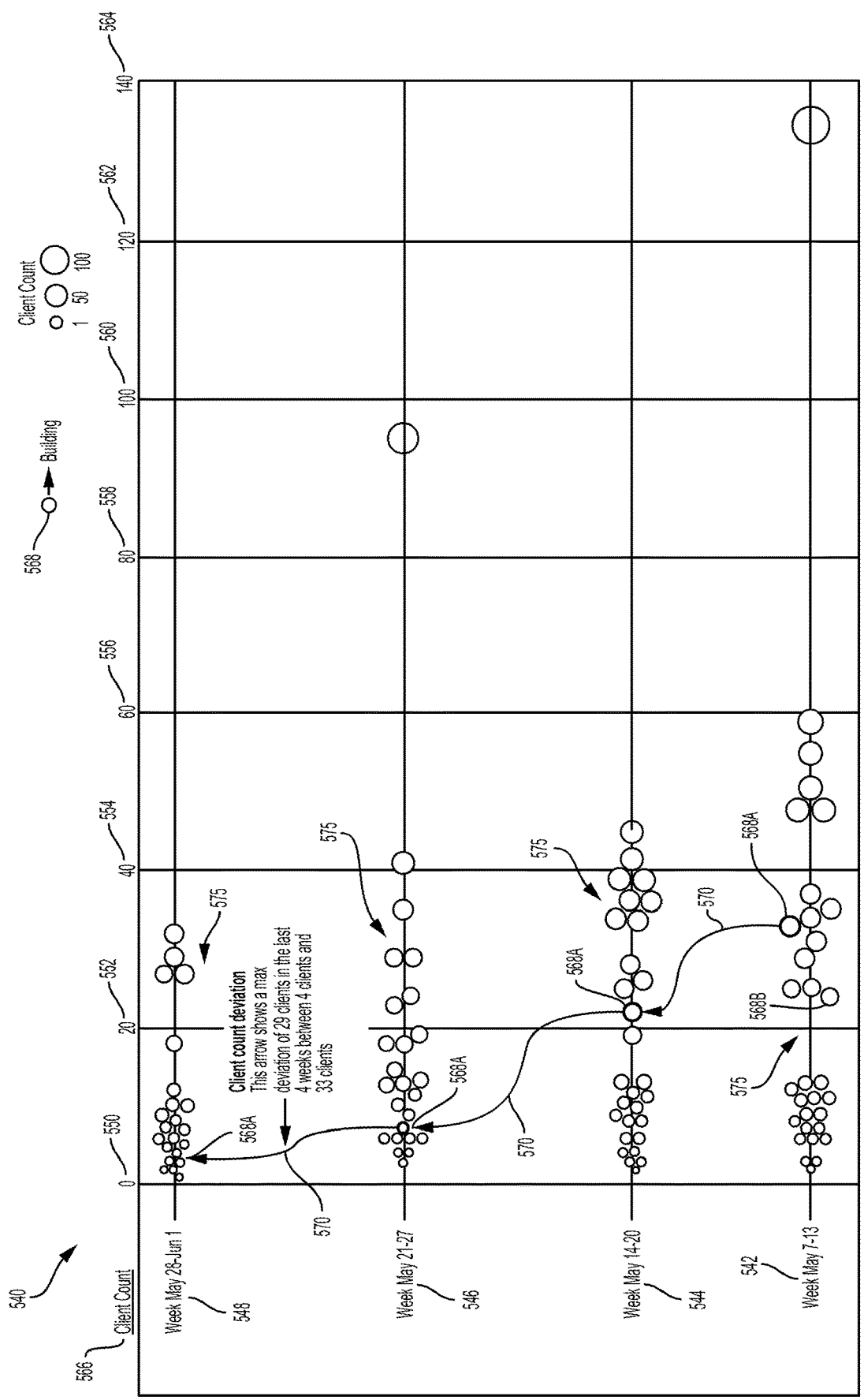

FIG. 5B illustrates an example interface 540 depicting insights 575 generated by the NAAS 400 (e.g., via insights generator engine 408) across different time intervals 542-548 for different buildings 568 on a network (e.g., 100, 300). In this example, the insights 575 depict client counts 566 for the different buildings 568 at the different time intervals 542-548. To visually depict the client counts 566 for the buildings 568, the buildings 568 are plotted, at the different time intervals 542-548, to specific client count values 550-564 along a horizontal axis (e.g., X axis) of client count values 550-564.

In this example, the location where a building 568 is plotted along the axis of client count values 550-564 for a particular time interval (542, 544, 546, 548) indicates the client count for that building 568 at that particular time interval (542, 544, 546, 548). For example, at time interval 542, the building 568B is plotted on the client count value 552 in the axis of client count values 550-564. The client count value 552 corresponds to 20 client counts. Thus, the interface 540 indicates that the NAAS 400 calculated 20 client counts at time interval 542 for the building 568B. As illustrated here, the interface 540 can visually depict the distribution of client count values 566 of buildings 568 across the different time intervals 542-548, and identify any anomalies in the client count values of the buildings 568 at any of the different time intervals 542-548.

The insights 575 can also include or depict a deviation 570 or trend in client count values 566 detected for building 568A across the different time intervals 542-548. For example, the deviation 570 shows that at time interval 542, the building 568A had a client count between 20 (552) and 40 (554). The deviation 570 shows that, at time interval 544, the building 568A had a client count slightly less than 20 (552), which indicates a decrease in client counts between time interval 542 and the time interval 544. The deviation 570 also shows that, at time interval 546 and time interval 548, the building 568A maintained a client count between 0 (550) and 20 (552), which indicates that the client count of the building 568A decreased from that of time interval 544 and remained largely constant between time interval 546 and time interval 548.

In interface 540, the size of the visual elements (e.g., circles) representing the buildings 568 correspond to the respective number of client counts for the buildings 568. For example, the higher the number of client counts associated with a building, the bigger the circle depicted in the interface 540 representing that building. The size of the circles representing the buildings 568 in the interface 540 can thus give a visual indication of their respective client counts at the various time intervals 542-548.

In some cases, the visual elements (e.g., circles) representing the buildings 568 in the interface 540 can also have other characteristics or patterns to depict other attributes or conditions associated with the buildings 568. For example, the circles representing the buildings 568 can be colored or patterned in different ways to depict different attributes or conditions. To illustrate, buildings 568 can be depicted in different colors to indicate respective locations associated with the buildings 568 or a respective number of issues (e.g., errors, failures, anomalies, configuration problems, deviations, etc.) associated with the buildings 568.

In some examples, other characteristics or patterns (e.g., fill color, size, shape, fill pattern, line pattern, etc.) associated with the visual elements representing the buildings 568, such as the circles representing the buildings 568 in the example of FIG. 5B, can also be used to visually indicate different degrees and/or types of attributes or conditions associated with the buildings 568. For example, the shape of visual elements representing the buildings 568 (e.g., circle, square, sphere, etc.) can be used to depict the type of building or network and the line pattern of visual elements can be used to depict an associated type of issue encountered at the building.

Figure 5C:
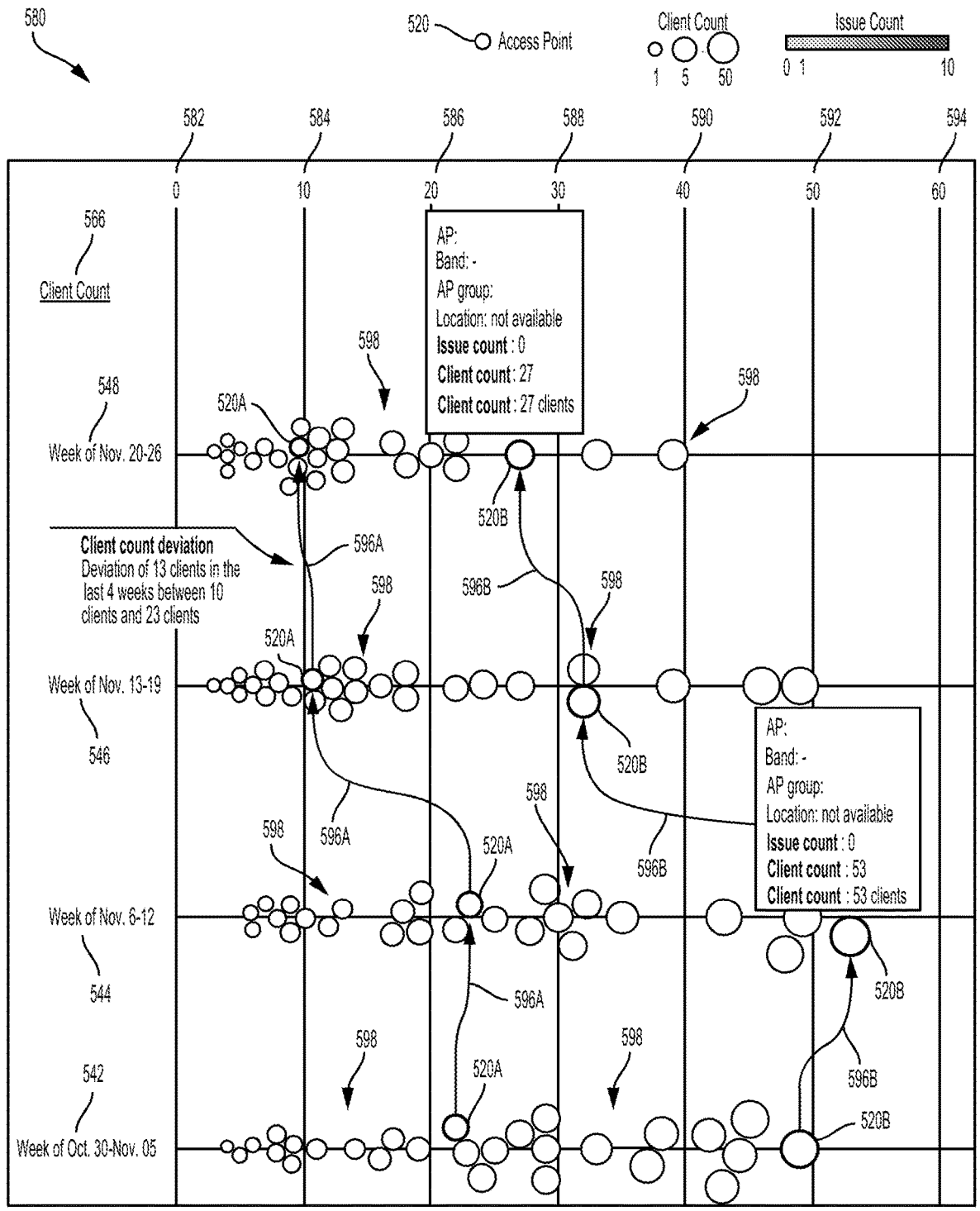

FIG. 5C illustrates an example interface 580 depicting insights 598 generated by the NAAS 400 (e.g., via insights generator engine 408) across different time intervals 542-548 for different access points 520 on a network (e.g., 100, 300). In this example, the insights 598 depict client counts 566 for the different access points 520 at the different time intervals 542-548. To visually depict the client counts 566 for the access points 520, the access points 520 are plotted, at the different time intervals 542-548, to specific client count values 582-594 along a horizontal axis (e.g., X axis) of client count values 582-594.

In this example, the location where an access point 520 is plotted along the axis of client count values 582-594 for a particular time interval (542, 544, 546, 548) indicates the client count for that access point 520 at that particular time interval (542, 544, 546, 548). For example, at time interval 542, the access point 520A is plotted between the client count value 586 and the client count value 588 in the axis of client count values 582-594. The client count values 586 and 588 correspond to 20 and 30 client counts, respectively. Thus, the interface 580 indicates that the NAAS 400 calculated between 20 and 30 client counts at time interval 542 for the access point 520B. As illustrated here, the interface 580 can visually depict the distribution of client count values 566 of access points 520 across the different time intervals 542-548, and identify any anomalies in the client count values of the access points 520 at any of the different time intervals 542-548.

The insights 598 can also include or depict deviations 596A-B or trends in client count values 566 detected for access points 520A and 520B across the different time intervals 542-548. For example, the deviation 596A shows that at time interval 542, the access point 520A had a client count between 20 (586) and 30 (588). The deviation 596A shows that, at time interval 544, the access point 520A had a client count also between 20 (586) and 30 (588), which indicates that the client count for access point 520A remained largely constant between time interval 542 and time interval 544. The deviation 596A also shows that, at time interval 546 and time interval 548, the access point 520A maintained a client count around 10 (584), which indicates that the client count of the access point 520A decreased from that of time interval 544 and remained largely constant between time interval 546 and time interval 548.

In interface 580, the size of the visual elements (e.g., circles) representing the access points 520 correspond to the respective number of client counts for the access points 520. For example, the higher the number of client counts associated with an access point, the bigger the circle depicted in the interface 580 representing that access point. The size of the circles representing the access points 520 in the interface 580 can thus give a visual indication of their respective client counts at the various time intervals 542-548.

In some cases, the visual elements (e.g., circles) representing the access points 520 in the interface 580 can also have other characteristics or patterns to depict other attributes or conditions associated with the access points 520. For example, the circles representing the access points 520 can be colored or patterned in different ways to depict different attributes or conditions. To illustrate, access points 520 can be depicted in different colors to indicate a respective number of issues (e.g., errors, failures, anomalies, configuration problems, deviations, etc.) associated with the access points 520.

In some examples, other characteristics or patterns (e.g., fill color, size, shape, fill pattern, line pattern, etc.) associated with the visual elements representing the access points 520, such as the circles representing the access points 520 in the example of FIG. 5C, can also be used to visually indicate different degrees and/or types of attributes or conditions associated with the access points 520. For example, the shape of visual elements representing the access points 520 (e.g., circle, square, sphere, etc.) can be used to depict the type of access point, and the line pattern of visual elements can be used to depict an associated type of issue encountered by the access point or a location of the access point.

Having described example systems and technologies, the disclosure now turns to the method 600 for dynamically generating topology, time, and location based network insights, as illustrated in FIG. 6. The steps outlined herein are examples and can be implemented in any combination thereof, including combinations that exclude, add, or modify certain steps.

At step 602, the method 600 can include determining (e.g., via the network configuration engine 402 in the NAAS 400) statistical changes in time series data associated with a network (e.g., 100, 300). The statistical changes in time series data can include threshold changes in the time series data. For example, in some cases, the statistical changes can include, without limitation, a threshold deviation from a mean or average of a set of values in the time series data, a threshold deviation from a mean or average of a set of values in a set of historical time series data, a threshold deviation from a highest or lowest value in the time series data, a threshold deviation from a highest or lowest value in a set of historical time series data, a deviation reflected in the time series data from a trend or pattern reflected in the time series data and/or historical data, etc.

The time series data can include a series of data points associated with one or more network conditions or parameters. For example, in some cases, the time series data can include, without limitation, a series of data points measured or collected for the network (or one or more segments or resources associated with the network) describing a throughput, an interference, an availability or uptime, a latency, a jitter, an error rate, a utilization, dynamic trending, an SLA, a connectivity, a health, a performance, a SNR, client or device counts, QoE parameters, QoS parameters, a packet loss, a network load, etc.

At step 604, the method 600 can include determining (e.g., via the time interval engine 404 in the NAAS 400) a period of time (e.g., a time interval) corresponding to one or more of the statistical changes in the time series data. In some examples, the period of time can be a period during one or more of the statistical changes in the time series data, such as a time interval between (or from) a beginning of one or more statistical changes and an end of the one or more statistical changes. In other words, in some cases, the period of time can encompass a time interval corresponding to a deviation in a state or condition (e.g., a change point) that is reflected in the time series data.

The period of time determined in step 604 can be used by the NAAS 400 to dynamically determine (e.g., via the time interval engine 404) a time interval or time scale over which a state of the network (or one or more segments and/or resources thereof) should be analyzed and/or over which insights should be generated for the network (or one or more segments and/or resources thereof). Thus, as described herein, the time period during which certain events or conditions occur in the network (e.g., as reflected in the statistical changes of the time series data) can be used to dynamically determine a time interval for generating insights.

At step 606, the method 600 can include obtaining (e.g., via the network data filter engine 406 in the NAAS 400) telemetry data (e.g., network metrics) corresponding to one or more segments of the network and one or more time intervals. The one or more segments of the network can include, for example and without limitation, a logical or virtual segment of the network, a physical segment of the network, a topology of the network, one or more resources on the network, a building on the network, an office on the network, a department on the network, a campus in the network, the entire network, etc.

Moreover, the one or more time intervals can define the time interval(s) corresponding to the telemetry data and/or reflected in the telemetry data. In some cases, the one or more time intervals can be calculated based on the period of time corresponding to one or more of the statistical changes in the time series data. For example and without limitation, in some cases, the length of each of the one or more time intervals can be determined based on (or correspond to) the length of the period of time corresponding to the one or more of the statistical changes in the time series data.

At step 608, the method 600 can include generating (e.g., via the insights generator engine 408 in the NAAS 400), based on the telemetry data, one or more insights about the one or more segments of the network. In some examples, the one or more insights can describe and/or identify a trend or statistical deviation in a behavior of the one or more segments of the network during the one or more time intervals.

Moreover, in some cases, the one or more insights can describe and/or identify events or statistics associated with the one or more segments of the network during the one or more time intervals. For example, the one or more insights can describe and/or identify a client count during the one or more time intervals, a throughput during the one or more time intervals, a latency during the one or more time intervals, an SNR during the one or more time intervals, interference levels during the one or more time intervals, resource utilization during the one or more time intervals, any errors or failures during the one or more time intervals, etc.

In some aspects, the telemetry data can include key performance indicators (KPIs) and the statistical deviation in the behavior of the one or more segments of the network can include a threshold deviation in one or more KPIs. Moreover, in some examples, generating the one or more insights about the one or more segments of the network can include comparing the telemetry data corresponding to the one or more segments of the network and the one or more time intervals with historical network telemetry data associated with the one or more segments of the network and/or one or more different segments of the network and, based on a comparison result, identifying the trend or statistical deviation in the behavior of the one or more segments of the network during the one or more time intervals.

In some examples, the one or more insights can identify a plurality of statistical deviations in the behavior of the one or more segments of the network during a plurality of time intervals. Moreover, the plurality of time intervals can be dynamically calculated based on the period of time corresponding to the one or more of the statistical changes in the time series data. For example, in some cases, the length of each time interval in the plurality of time intervals can be based on (or correspond to) the length of the period of time corresponding to the one or more of the statistical changes in the time series data.

In some aspects, the method 600 can include determining (e.g., via the ranking engine 410 in the NAAS 400) a severity of each of the plurality of statistical deviations in the behavior of the one or more segments of the network, and ranking the plurality of statistical deviations in the behavior of the one or more segments of the network based on the severity of each of the plurality of statistical deviations in the behavior of the one or more segments of the network. In some examples, the severity of each of the plurality of statistical deviations can be determined based on a distance between a distribution of a set of KPI values associated with each time interval from the plurality of time intervals and a kind of KPI metric (e.g., throughput, latency, interference, SNR, jitter, performance, error rate, etc.) associated with each KPI value in the set of KPI values. In some cases, the severity can also be based on other parameters such as, for example, a location, configuration, or role of the one or more segments of the network.

In some aspects, determining the severity of each of the plurality of statistical deviations in the behavior of the one or more segments of the network can include applying a weight to each KPI value in the set of KPI values to yield weighted KPI values, and determining the severity of each of the plurality of statistical deviations based on the weighted KPI values. For example, if certain KPI metrics are deemed more relevant or important than other KPI metrics (or are to be given more weight), the KPI values associated with those KPI metrics can be assigned different weights than the KPI values associated with the other KPI metrics in order to increase the weight or influence of those KPI values when determining the severity of the statistical deviations (and vice versa). This way, when determining the severity, some KPI values can contribute more than others, depending on what is deemed to have more importance, relevance, significance, and/or priority.

The disclosure now turns to FIGS. 7 and 8, which illustrate example network devices and computing device architectures, such as switches, routers, client devices, endpoints, servers, and so forth.

FIG. 7 illustrates an example network device 700 suitable for performing switching, routing, and other networking operations. Network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 can accomplish these functions under the control of software including an operating system and any appropriate applications software. CPU 704 may include one or more processors 708, such as a processor from the INTEL X96 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

FIG. 8 illustrates an example computing system architecture 800 wherein the components of the computing system architecture 800 are in electrical communication with each other using a connection 806, such as a bus. The example computing system architecture 800 includes a processing unit (CPU or processor) 804 and a system connection 806 that couples various system components including the system memory 820, such as read only memory (ROM) 818 and random access memory (RAM) 816, to the processor 804. The computing system architecture 800 can include a cache 802 of high-speed memory connected directly with, in close proximity to, or integrated as part of the processor 804. The computing system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 816, read only memory (ROM) 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   determining statistical changes in time series data associated with one or more segments of a network, wherein the statistical changes include a threshold deviation in the time series data associated with one or more network conditions or parameters;
   determining a length of a period of time corresponding to the threshold deviation in the time series data;
   obtaining telemetry data that includes a plurality of key performance indicators (KPIs) associated with the one or more segments of the network during a corresponding one or more time intervals, wherein a respective length of each of the one or more time intervals is based on the length of the period of time corresponding to the threshold deviation in the time series data;
   generating, based on the telemetry data, one or more insights about the one or more segments of the network, the one or more insights identifying a trend or statistical deviation in at least one KPI from the plurality of KPIs during the one or more time intervals, wherein the trend or statistical deviation in the at least one KPI from the plurality of KPIs identifies a plurality of statistical deviations during a plurality of time intervals;
   determining a severity of each of the plurality of statistical deviations including:
      applying a respective weight to each KPI value in the respective set of KPI values to yield weighted KPI values; and
      determining the severity of each of the plurality of statistical deviations based on the respective weighted KPI values and a respective distance between a distribution of a respective set of weighted KPI values associated with each of the plurality of time intervals; and
   modifying one or more aspects of the network based on the one or more insights about the one or more segments of the network and the severity of each of the plurality of statistical deviations.

2. The method of claim 1, wherein modifying the one or more aspects of the network comprises at least one of modifying one or more configuration settings associated with the one or more segments of the network, deploying one or more devices on the network, and removing one or more devices on the network.

3. The method of claim 1, wherein the statistical deviation in the at least one KPI corresponds to a first segment from the one or more segments during a first time interval from the one or more time intervals, and wherein generating the one or more insights comprises:
   comparing the telemetry data corresponding to the first segment during the first time interval with historical network telemetry data associated with the first segment during at least one time interval different than the first time; and
   based on a comparison result, identifying the trend or statistical deviation in the at least one KPI from the plurality of KPIs during the first time interval.

4. The method of claim 1, wherein the statistical deviation in the at least one KPI corresponds to a first segment from the one or more segments during a first time interval from the one or more time intervals, and wherein generating the one or more insights comprises:
  comparing the telemetry data corresponding to the first segment during the first time interval with historical network telemetry data associated with one or more other segments of the network; and
  based on a comparison result, identifying the trend or statistical deviation in the at least one KPI from the plurality of KPIs during the first time interval.

5. The method of claim 1, wherein the respective length of each of the plurality of time intervals is based on the length of the period of time corresponding to the threshold deviation in the time series data.

6. The method of claim 5, wherein the severity of each of the plurality of statistical deviations is further determined based on a kind of KPI metric associated with each KPI value in the respective set of KPI values; and
  further comprising ranking the plurality of statistical deviations based on the severity.

7. The method of claim 1, wherein generating the one or more insights about the one or more segments of the network comprises:
  calculating weighted insight parameters associated with at least one of the one or more segments of the network and one or more different segments of the network, the weighted insight parameters being calculated by applying respective weights to at least one of:
    network parameters in the telemetry data or historical network telemetry data associated with at least one of the one or more segments of the network and the one or more different segments of the network; and
    location parameters identifying at least one of the one or more segments of the network and the one or more different segments of the network;
  comparing the weighted insight parameters; and
  based on a comparison result, identifying the statistical deviation in the at least one KPI from the plurality of KPIs during the one or more time intervals.

8. A system comprising:
  one or more processors; and
  at least one non-transitory computer-readable medium having stored therein instructions which, when executed by the one or more processors, cause the system to:
    determine statistical changes in time series data associated with one or more segments of a network, wherein the statistical changes include a threshold deviation in the time series data associated with one or more network conditions or parameters;
    determine a length of a period of time corresponding to the threshold deviation in the time series data;
    obtain telemetry data that includes a plurality of key performance indicators (KPIs) associated with the one or more segments of the network during a corresponding one or more time intervals, wherein a respective length of each time interval is based on the length of the period of time corresponding to the threshold deviation in the time series data;
    generate, based on the telemetry data, one or more insights about the one or more segments of the network, the one or more insights identifying a trend or statistical deviation in at least one KPI from the plurality of KPIs during the one or more time intervals, wherein the trend or statistical deviation in the at least one KPI from the plurality of KPIs identifies a plurality of statistical deviations during a plurality of time intervals;
    determine a severity of each of the plurality of statistical deviations including:
      applying a respective weight to each KPI value in the respective set of KPI values to yield weighted KPI values; and
      determining the severity of each of the plurality of statistical deviations based on the respective weighted KPI values and a respective distance between a distribution of a respective set of weighted KPI values associated with each of the plurality of time intervals; and
    modify one or more aspects of the network based on the one or more insights about the one or more segments of the network.

9. The system of claim 8, wherein modifying the one or more aspects of the network comprises at least one of modifying one or more configuration settings associated with the one or more segments of the network, deploying one or more devices on the network, and removing one or more devices on the network.

10. The system of claim 8, wherein the statistical deviation in the at least one KPI corresponds to a first segment from the one or more segments during a first time interval from the one or more time intervals, and wherein generating the one or more insights comprises:
  comparing the telemetry data corresponding to the first segment during the first time interval with historical network telemetry data associated with the first segment during at least one time interval different than the first time interval; and
  based on a comparison result, identifying the trend or statistical deviation in the at least one KPI from the plurality of KPIs during the first time interval.

11. The system of claim 8, wherein the respective length of each of the plurality of time intervals is based on the length of the period of time corresponding to the threshold deviation in the time series data.

12. The system of claim 11, wherein the severity of each of the plurality of statistical deviations is further determined based on a kind of KPI metric associated with each KPI value in the respective set of KPI values; and
  wherein the at least one non-transitory computer-readable medium stores instructions which, when executed by the one or more processors, cause the system to rank the plurality of statistical deviations based on the severity.

13. The system of claim 8, wherein generating the one or more insights about the one or more segments of the network comprises:
  calculating weighted insight parameters associated with at least one of the one or more segments of the network and one or more different segments of the network, the weighted insight parameters being calculated by applying respective weights to at least one of:
    network parameters in the telemetry data or historical network telemetry data associated with at least one of the one or more segments of the network and the one or more different segments of the network; and
    location parameters identifying at least one of the one or more segments of the network and the one or more different segments of the network;

comparing the weighted insight parameters; and based on a comparison result, identifying the statistical deviation in the at least one KPI from the plurality of KPIs during the one or more time intervals.

14. A non-transitory computer-readable storage medium comprising:

instructions which, when executed by one or more processors, cause the one or more processors to:

determine statistical changes in time series data associated with one or more segments of a network, wherein the statistical changes include a threshold deviation in the time series data associated with one or more network conditions or parameters;

determine a length of a period of time corresponding to the threshold deviation in the time series data;

obtain telemetry data that includes a plurality of key performance indicators (KPIs) associated with the one or more segments of the network during a corresponding one or more time intervals, wherein a respective length of each time interval is based on the length of the period of time corresponding to the threshold deviation in the time series data;

generate, based on the telemetry data, one or more insights about the one or more segments of the network, the one or more insights identifying a trend or statistical deviation in at least one KPI from the plurality of KPIs during the one or more time intervals, wherein the trend or statistical deviation in the at least one KPI from the plurality of KPIs identifies a plurality of statistical deviations during a plurality of time intervals;

determine a severity of each of the plurality of statistical deviations including:

applying a respective weight to each KPI value in the respective set of KPI values to yield weighted KPI values; and determining the severity of each of the plurality of statistical deviations based on the respective weighted KPI values and a respective distance between a distribution of a respective set of weighted KPI values associated with each of the plurality of time intervals; and modify one or more aspects of the network based on the one or more insights about the one or more segments of the network.

15. The non-transitory computer-readable storage medium of claim 14, wherein modifying the one or more aspects of the network comprises at least one of modifying one or more configuration settings associated with the one or more segments of the network, deploying one or more devices on the network, and removing one or more devices from the network.

16. The non-transitory computer-readable storage medium of claim 15, wherein the statistical deviation in the at least one KPI corresponds to a first segment from the one or more segments during a first time interval from the one or more time intervals, and wherein generating the one or more insights comprises:

comparing the telemetry data corresponding to the first segment during the first time interval with historical network telemetry data associated with the first segment during at least one time interval different than the first time interval; and based on a comparison result, identifying the trend or statistical deviation in the at least one KPI from the plurality of KPIs during the first time interval.

17. The non-transitory computer-readable storage medium of claim 16, wherein the severity of each of the plurality of statistical deviations is further determined based on a kind of KPI metric associated with each KPI value in the respective set of KPI values; and storing instructions which, when executed by the one or more processors, cause the one or more processors to rank the plurality of statistical deviations based on the severity.

* * * * *